(12) United States Patent
Omae et al.

(10) Patent No.: US 9,045,156 B2
(45) Date of Patent: Jun. 2, 2015

(54) ELECTRIC DRIVING DEVICE AND ELECTRIC POWER STEERING SYSTEM INCLUDING THE SAME

(75) Inventors: Katsuhiko Omae, Chiyoda-ku (JP); Tsutomu Tominaga, Chiyoda-ku (JP); Shinichi Ito, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/580,284

(22) PCT Filed: Oct. 22, 2010

(86) PCT No.: PCT/JP2010/068691
§ 371 (c)(1),
(2), (4) Date: Aug. 21, 2012

(87) PCT Pub. No.: WO2011/142050
PCT Pub. Date: Nov. 17, 2011

(65) Prior Publication Data
US 2012/0313467 A1    Dec. 13, 2012

(30) Foreign Application Priority Data

May 11, 2010    (JP) ................................ 2010-109156

(51) Int. Cl.
*H02P 1/00*    (2006.01)
*B62D 5/04*    (2006.01)
(Continued)

(52) U.S. Cl.
CPC ............ *B62D 5/0406* (2013.01); *H02K 7/1166* (2013.01); *H02K 11/0073* (2013.01); *H02P 27/08* (2013.01); *H02M 7/5387* (2013.01)

(58) Field of Classification Search
CPC . B62D 5/0406; H02K 11/0073; H02K 5/225; H02K 9/22; H02K 7/20854
USPC .................. 318/139, 254, 432; 310/71, 72, 68
See application file for complete search history.

(56) References Cited

U.S. PATENT DOCUMENTS 5,844,386 A    12/1998    Matsuoka et al.
7,989,997 B2    8/2011    Hashimoto et al.
(Continued)

FOREIGN PATENT DOCUMENTS

JP             924847 A    1/1997
JP        200043740 A    2/2000
(Continued)

OTHER PUBLICATIONS
International Search Report for PCT/JP2010/068691 dated Jan. 25, 2011).
(Continued)

*Primary Examiner* — Rina Duda
*Assistant Examiner* — Bickey Dhakal
(74) *Attorney, Agent, or Firm* — Sughrue Mion, PLLC; Richard C. Turner

(57) ABSTRACT

A control device (3) controlling an electric motor (2) is disposed on an axial line of a rotor shaft (30) of the electric motor (2). The control device (3) includes semiconductor switching devices (15) forming a three-phase bridge circuit that controls a current of the electric motor (2) and capacitors (13) that suppresses a ripple component of a current flowing to the electric motor (2). The semiconductor switching devices (15) and the capacitors (13) are provided in pairs for respective arms of the three-phase bridge circuit and disposed concentrically. Hence, impedance across the three-phase circuit controlling a current flowing to the electric motor is reduced. Consequently, not only can ripples be absorbed efficiently but also power efficiency of a driving device can be enhanced.

24 Claims, 6 Drawing Sheets

(51) Int. Cl.
  *H02K 11/00* (2006.01)
  *H02P 27/08* (2006.01)
  *H02K 7/116* (2006.01)
  *H02M 7/5387* (2007.01)

(56) References Cited

U.S. PATENT DOCUMENTS

| | | | |
|---|---|---|---|
| 2003/0173920 A1* | 9/2003 | Tominaga et al. | 318/432 |
| 2005/0167183 A1* | 8/2005 | Tominaga et al. | 180/444 |
| 2006/0108884 A1 | 5/2006 | Shiino et al. | |
| 2008/0049476 A1* | 2/2008 | Azuma et al. | 363/131 |
| 2010/0052449 A1 | 3/2010 | Hashimoto et al. | |
| 2010/0288577 A1 | 11/2010 | Sonoda et al. | |
| 2010/0314192 A1 | 12/2010 | Nagase et al. | |
| 2011/0011633 A1 | 1/2011 | Uchida et al. | |
| 2011/0066332 A1 | 3/2011 | Sonoda et al. | |

FOREIGN PATENT DOCUMENTS

| | | | |
|---|---|---|---|
| JP | 2000318628 A | | 11/2000 |
| JP | 2001-206232 A | | 7/2001 |
| JP | 2001206232 A | * | 7/2001 |
| JP | 2002345211 A | | 11/2002 |
| JP | 2003267233 A | | 9/2003 |
| JP | 2004-23877 A | | 1/2004 |
| JP | 2004023877 A | * | 1/2004 |
| JP | 2004-48823 A | | 2/2004 |
| JP | 2006168705 A | | 6/2006 |
| JP | 2006180643 A | | 7/2006 |
| JP | 2007-62433 A | | 3/2007 |
| JP | 2007186145 A | | 7/2007 |
| JP | 2008174097 A | | 7/2008 |
| JP | 200912631 A | | 1/2009 |
| JP | 4252486 B2 | | 4/2009 |
| JP | 2009-124772 A | | 6/2009 |
| JP | 2009124772 A | * | 6/2009 |
| JP | 2009188271 A | | 8/2009 |
| JP | 2009-248864 A | | 10/2009 |
| JP | 2009248864 A | * | 10/2009 |
| JP | 201030489 A | | 2/2010 |
| JP | 201063242 A | | 3/2010 |
| JP | 2010-92999 A | | 4/2010 |
| JP | 2010092999 A | * | 4/2010 |
| JP | 2010195219 A | | 9/2010 |
| WO | 2008146664 A1 | | 12/2008 |
| WO | 2009101779 A1 | | 8/2009 |
| WO | 2009125506 A1 | | 10/2009 |
| WO | 2010/007672 A1 | | 1/2010 |
| WO | 2010007672 A1 | | 1/2010 |
| WO | WO 2010007672 A1 | * | 1/2010 |

OTHER PUBLICATIONS

Chinese Office Action, Application No. 201080065513; Apr. 1, 2014.
Japanese Office Action issued on Nov. 12, 2013 in Japanese Patent Application No. 2012-540703.

* cited by examiner

250

ELECTRIC DRIVING DEVICE AND ELECTRIC POWER STEERING SYSTEM INCLUDING THE SAME

CROSS REFERENCE TO RELATED APPLICATIONS

This application is a National Stage of International Application No. PCT/JP2010/068691 filed Oct. 22, 2010, claiming priority based on Japanese Patent Application No. 2010-109156 filed May 11, 2010, the contents of all of which are incorporated herein by reference in their entirety.

TECHNICAL FIELD

The present invention relates to an electric driving device and to an electric power steering system that provides power-assistance to a steering apparatus of a vehicle using a driving force of the electric driving device.

BACKGROUND ART

There is an electric power steering system in the related art including an electric motor that outputs an auxiliary torque to a steering wheel of a vehicle and a control device that drives the electric motor under control, which are installed in the form of an electric driving device by attaching the control device to the electric motor.

For example, Patent Document 1 discloses an electric power steering system incorporating an electric driving device formed of a control device disposed on an axial line of a rotor shaft of an electric motor and fixed to the electric motor. Also, Patent Document 2 discloses an electric power steering system in which a control device is fixed onto a bracket of an electric motor and a housing of the control device and a cover of the housing are attached parallel to an axial direction of the electric motor.

In the electric driving device disclosed in Patent Document 1 or Patent Document 2, the control device is disposed on the axis line of the rotor shaft of the electric motor or on the bracket of the electric motor and fixed to the electric motor. Power boards are integrated into a single board and electrolytic capacitors are gathered at one point.

Also, the electric driving device as above is configured in such a manner that heat from a coil or electrolytic capacitors, which are heating components, is released into a space within an electronic control unit (hereinafter, abbreviated to ECU). Further, the electric driving device as above is configured in such a manner that a power portion and a control portion are connected by disposing terminals in a row and heat is released by providing a heat sink to the ECU or a motor case.

Also, in the electric driving device disclosed in Patent Document 2, a power line is formed of bus bars and a structure is formed by resin molding.

RELATED ART DOCUMENTS

Patent Documents

Patent Document 1: JP-A-2007-62433
Patent Document 2: Japanese Patent No. 4252486

SUMMARY OF THE INVENTION

Problems to be Solved by Invention

According to the electric driving device disclosed in Patent Document 1 or Patent Document 2, the power portion through which a large current is flown and the electrolytic capacitors are connected at a distance. Hence, there is a problem that impedance between respective arms of a bridge circuit formed of semiconductor devices and forming the power portion and the electrolytic capacitors increases.

Also, with the electric driving device disclosed in Patent Document 2, bus bars through which a large current is flown cannot be aligned parallel to each other and it is difficult to align the bus bars along arm portions of the bridge circuit.

Further, the electric driving device disclosed in Patent Document 1 or Patent Document 2 has a poor heat dissipation effect because the electrolytic capacitors and the coil release heat into a space within the ECU case.

Furthermore, for the electric driving device disclosed in Patent Document 1 or Patent Document 2, it is necessary to release heat from the heating portion using the heat sink built in the ECU. Moreover, in the electric driving device disclosed in Patent Document 2, a connection of the power portion and the control board is formed of terminal members aligned in a row and this configuration deteriorates mounting efficiency of the control board.

The invention is devised to solve the problems discussed above and has an object to provide an electric driving device that enhances power efficiency of the driving device while efficiently absorbing ripples by reducing impedance across a three-phase bridge circuit that controls a current flowing into an electric motor and an electric power steering system including this electric driving device.

Means for Solving the Problems

An electric driving device of the invention includes an electric motor and a control device disposed on an axial line of a rotor shaft of the electric motor and controlling driving of the electric motor. The electric control device includes: semiconductor switching devices forming a three-phase bridge circuit that controls a current of the electric motor; capacitors suppressing a ripple component of a current flowing to the electric motor; a coil reducing noises generated during a switching action of the semiconductor switching devices; a power circuit portion including the semiconductor switching devices, the capacitors, and the coil; a heat sink releasing heat generated from the power circuit portion; and a control board on which is mounted a microcomputer that generates a drive signal to drive the semiconductor switching devices. The semiconductor switching devices and the capacitors are provided in pairs for respective arms of the three-phase bridge circuit and disposed concentrically with the rotor shaft.

Advantage of the Invention

According to the electric driving device of the invention, the semiconductor switching devices forming the three-phase bridge circuit that controls a current of the electric motor and the capacitors that suppress a ripple component of a current flowing to the electric motor are provided in pairs for the respective arms of the three-phase circuit and disposed concentrically with the rotor shaft. Accordingly, impedance across the three-phase bridge circuit can be reduced. Hence, not only can ripples be absorbed efficiently, but also power efficiency of the driving device can be enhanced.

The foregoing and other objects features, aspects, and advantages of the present invention will become more apparent from the following detailed description of the present invention when taken conjunction with the accompanying drawings.

MODE FOR CARRYING OUT THE INVENTION

Figure 1:
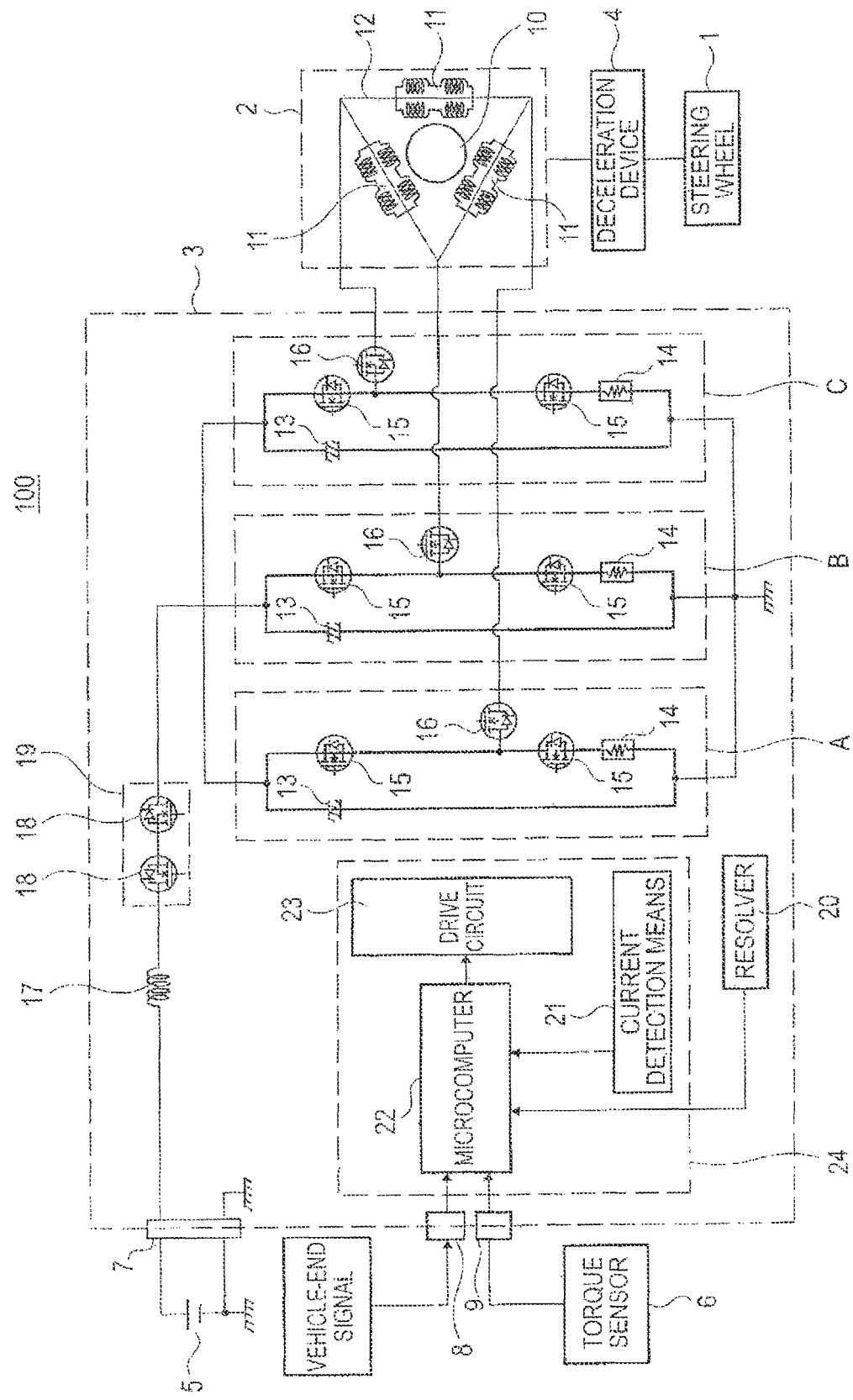
FIG. 1 is a view showing a block configuration of an electric power steering system according to a first embodiment of the invention.

Hereinafter, preferred embodiments of an electric driving device of the invention and an electric power steering system including this electric driving device will be descried with reference to the accompanying drawings. Descriptions will be given by labeling like components with like reference numerals in the respective embodiments below.

First Embodiment

FIG. 1 is a view showing a block configuration of an electric power steering system according to a first embodiment. Referring to FIG. 1, an electric power steering system 100 includes an electric motor 2 that outputs an auxiliary torque to a steering wheel 1 of a vehicle, a control device 3 that controls driving of the electric motor 2, a deceleration device 4 that decreases a rotation speed of the electric motor 2, a battery 5 that supplies a current to drive the electric motor 2, and a torque sensor 6 that detects a steering torque on the steering wheel 1.

The electric power steering device 100 also includes a power connector 7 that electrically connects the battery 5 and the control device 3, a vehicle-end signal connector 8 in which a vehicle-end signal, such as a running speed signal of a vehicle, from the vehicle end is inputted, and a torque sensor connector 9 that electrically connects the torque sensor 6 and the control device 3. The electric motor 2 is formed of a three-phase brushless motor and includes a rotor 10 and a stator 12 having U-phase, V-phase, and W-phase armature windings 11.

The control device 3 includes large-capacity capacitors 13 (about 2200 μF×3) used to absorb a ripple component of a motor current Im flown into the electric motor 2, shunt resistors 14 used to detect the motor current Im, semiconductor switching devices (for example, FETs) 15 together forming a three-phase bridge circuit that switches the motor current Im according to magnitude and a direction of an auxiliary torque to be outputted to the steering wheel 1, and semiconductor switching devices (for example, FETs) 16 each forming a motor relay as a switching means for passing or interrupting the motor current Im to be supplied to the electric motor 2 from the corresponding semiconductor switching devices 15. The control device 3 further includes a power circuit portion including power boards 35 described below on which are mounted the shunt resistors 14 and the semiconductor switching devices 15 and 16, a coil 17 that prevents an electromagnetic noise generated during a switching action of the semiconductor switching devices 15 from flowing out to the outside and becoming a radio noise, semiconductor switching devices (for example, FETs) 18 forming a power supply relay as a switching means for passing or interrupting a battery current Ib supplied from the battery 5 to the semiconductor switching devices 15, and a relay board 19 on which the semiconductor switching devices 18 are mounted. It should be appreciated that each semiconductor switching device (for example, FET) 16 may be formed of more than one semiconductor switching device. Further, the semiconductor switching devices 16 are included as components of the bridge circuit.

Also, the control device 3 includes a resolver 20 as a rotation position sensor that detects a rotation position of the rotor 10, a current detection means 21 connected to one ends of the shunt resistors 14 for detecting a current flowing to the electric motor 2, a microcomputer 22 that computes an auxiliary torque on the basis of a steering torque signal from the torque sensor 6 and also computes a current equivalent to the auxiliary torque on the basis of the motor current Im and the rotation position of the rotor 10 detected by the resolver 20, both of which are fed back to the microcomputer 22, a drive circuit 23 that outputs a drive signal to control operations of the semiconductor switching devices 15 according to a command from the microcomputer 22, and a control board 24 on which the current detection means 21, the microcomputer 22, and the drive circuit 23 are mounted. The microcomputer 22 further includes a known self-diagnostic function in addition to an A-to-D converter and a PWM timer circuit and constantly conducts a self-diagnosis as to whether the system is normally operating, so that the motor current Im is interrupted upon occurrence of an abnormality.

In the electric power steering system 100 configured as above, a steering torque from the torque sensor 6 and rotation position information of the rotor 10 from the resolver 20 are inputted into the microcomputer 22. Also, from the vehicle-end signal connector 8, a running speed signal as one of vehicle-end signals is inputted into the microcomputer 22. In addition, the motor current Im is fed back from the shunt resistors 14 via the current detection means 21 and inputted into the microcomputer 22. The microcomputer 22 generates a rotation direction command for power steering and a current control amount equivalent to an auxiliary torque on the basis of the information and signals inputted therein and respective drive signals are inputted into the drive circuit 23.

Upon input of the rotation direction command and the current control amount, the drive circuit 23 generates a PWM drive signal and applies the PWM drive signal to the semiconductor switching devices 15. Consequently, a current from the battery 5 is flown into the electric motor 2 via the power connector 7, the coil 17, and the semiconductor switching devices 18, 15, and 16 and a required amount of auxiliary torque is outputted in a required direction.

In this instance, because the motor current Im detected via the shunt resistors 14 and the current detection means 21 is fed back to the microcomputer 22, the motor current Im is controlled to coincide with a motor current command IM sent from the microcomputer 22 to the drive circuit 23. Also, although the motor current Im includes a ripple component due to a switching action of the semiconductor switching devices 15 during PWM driving, the motor current Im are smoothened by the large-capacity capacitors 13 and then controlled.

Figure 2:
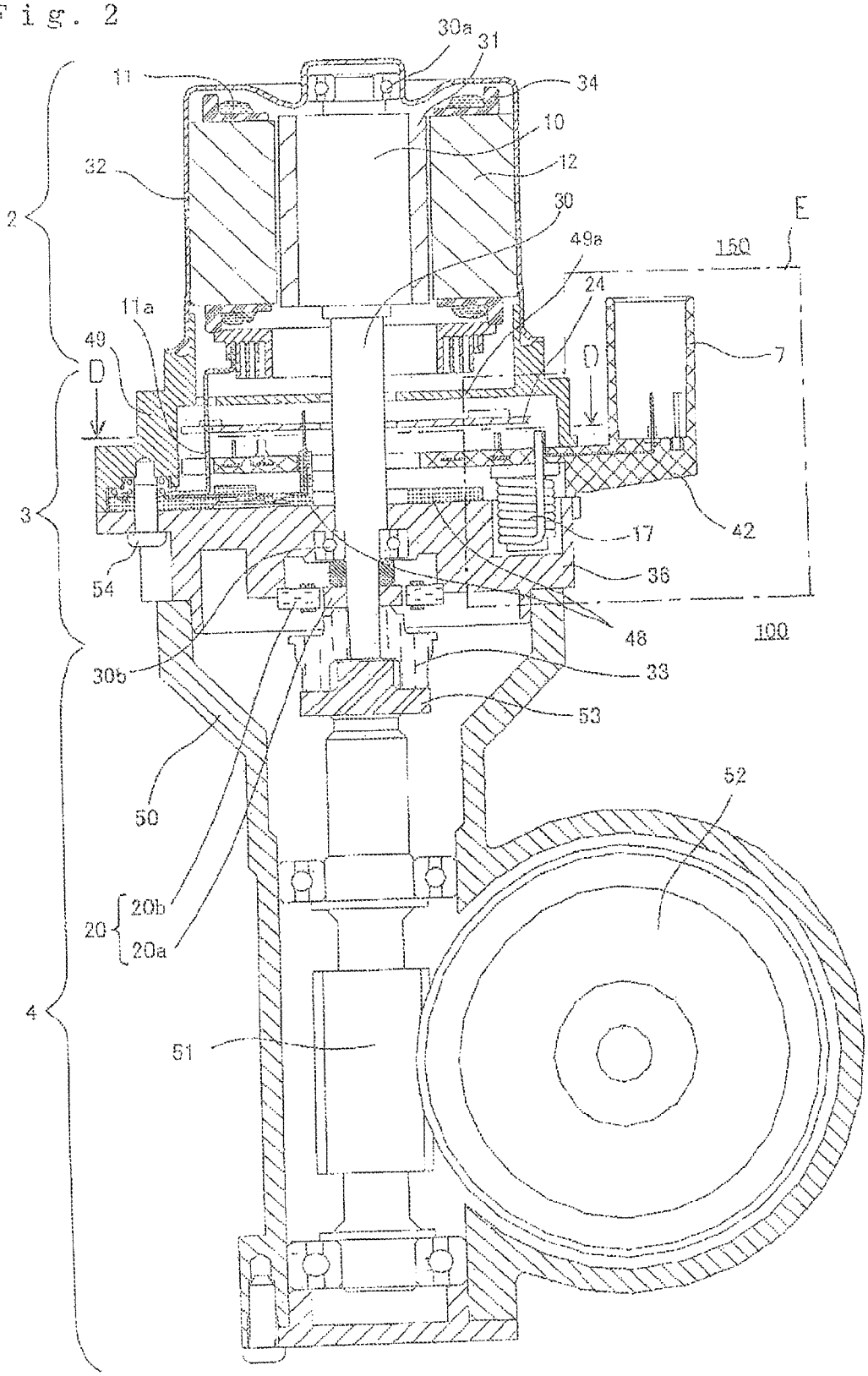
FIG. 2 is a cross section of the electric power steering system according to the first embodiment of the invention.
Figure 3:
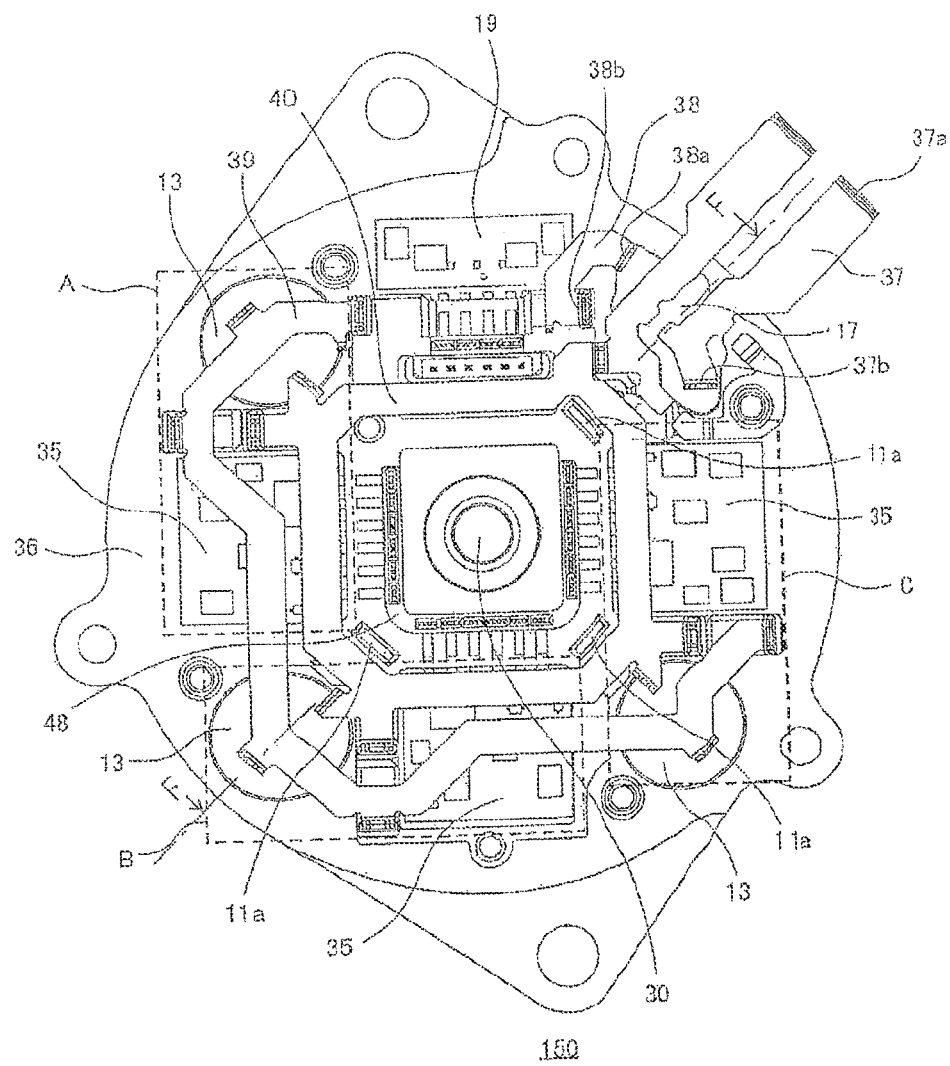
FIG. 3 is a cross section taken along the line D-D of FIG. 2 to show a sectional side view of a major portion of an electric driving device used in the electric power steering system according to the first embodiment of the invention.
Figure 4:
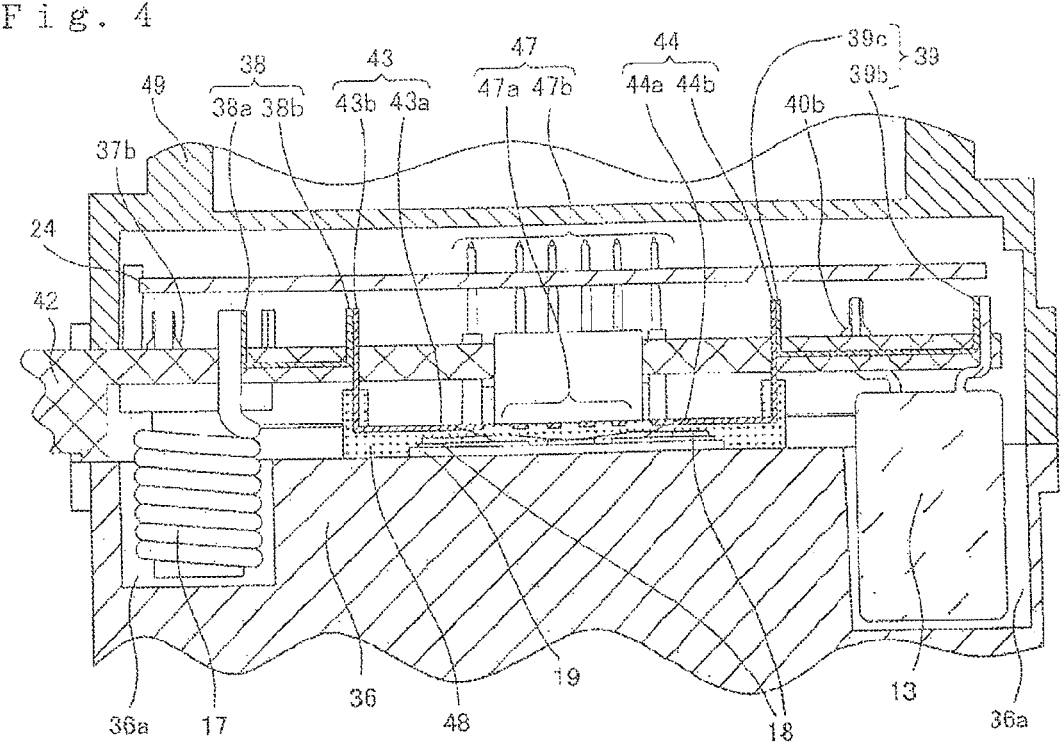
FIG. 4 is a cross section taken along the line F-F of FIG. 3 to show a cross section of a major portion used to describe in detail a major portion of the electric drive device used in the electric power steering system according to the first embodiment of the invention.
Figure 5:
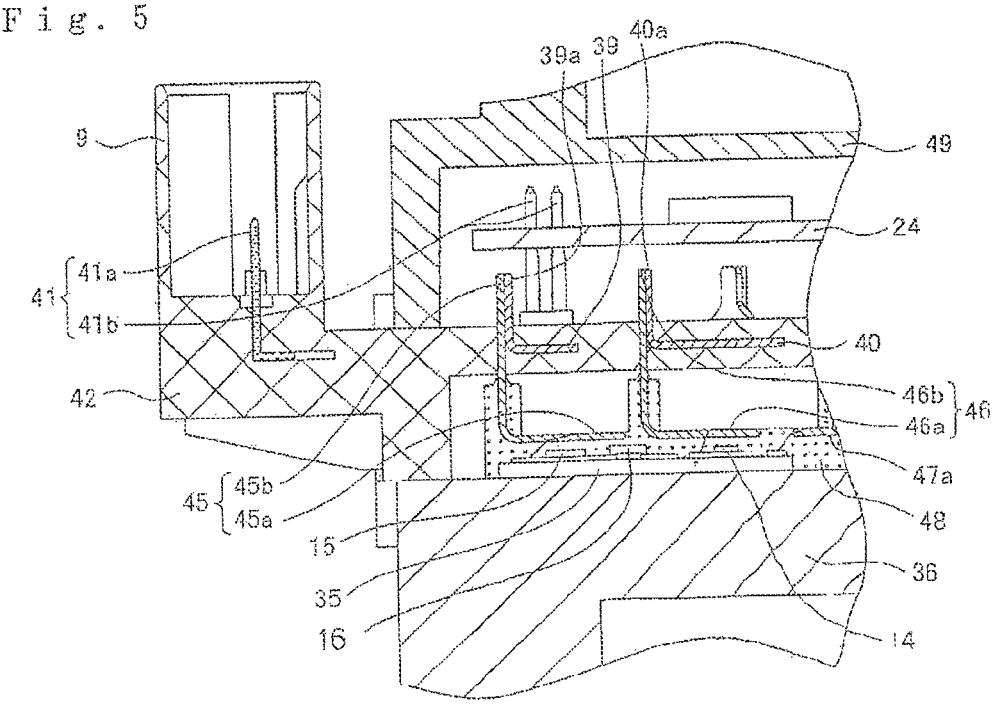
FIG. 5 is a cross section of a portion E of FIG. 2 to show a cross section of a major portion used to describe in detail a major portion of the electric drive device used in the electric power steering system according to the first embodiment of the invention.

A structure of the electric power steering system 100 described above will now be described with reference to FIG. 2 through FIG. 5. FIG. 2 is a cross section of the electric power steering system 100. FIG. 3 is a cross section taken along the line D-D of FIG. 2 to show a sectional side view of a major portion of an electric driving device used in the electric power steering system 100. The power connector 7 and a motor housing 49 are omitted in this drawing. Also, FIG. 4 is a cross section taken along the line F-F of FIG. 3 to show a cross section of a major portion used to describe a major portion of the electric drive device in detail. The control board 24, the motor housing 49, and a circuit case 42 are included in this drawing. FIG. 5 is a cross section of a portion E of FIG. 2 to show a major portion used to describe a major portion of the electric driving device in detail. The coil 17 is omitted in this drawing.

Referring to FIG. 2 through FIG. 5, numeral 150 (FIG. 2) denotes an electric driving device. The electric motor 2 of the electric driving device 150 includes a rotor shaft 30, a rotor 10 that is a cylindrical permanent magnet 31 magnetized in ten poles and fixed to the rotor shaft 30, a stator 12 provided on the periphery of the rotor 10, a yoke 32 made of iron to which the stator 12 is fixed, and a coupling 33 fixed at an end of the rotor shaft 30 and transmitting a torque of the electric motor 2. The rotor shaft 30 is supported on bearings 30a and 30b in a rotatable manner.

The stator 12 includes an insulator 34 attached to 12 salient poles opposing an outer periphery of the permanent magnet 31 and the armature windings 11 wound around the insulator 34 and connected to the three phases: a phase U, a phase V, and a phase W. Winding end portions 11a of the armature windings 11 extend in a direction to the control device 3 parallel to an axial direction of the electric motor 2 and are connected to respective output terminals of the phase U, the phase V, and phase W.

The control device 3 controlling the driving of the electric motor 2 includes: the power boards 35 (FIGS. 3 and 5) and the relay board 19 (FIGS. 3 and 4) formed of high thermal conductive ceramic boards; the control board 24 (FIGS. 2, 4, and 5) formed of an insulating printed-circuit board; a heat sink 36 (FIG. 2 through FIG. 5) formed of an aluminum die cast made of high thermal conductive metal, for example, aluminum or aluminum alloy; a circuit case 42 (FIGS. 2, 4, and 5) in which plural electrical conducting plates 37, 38, 39, 40 and 41 (FIG. 3 through FIG. 5) are insert-molded with insulating resin, and electrical conducting plates 38 and 39 electrically connected to the coil 17 (FIG. 2 through FIG. 4) used to remove an electromagnetic noise and to the large-capacity capacitors 13 (FIGS. 3 and 4) (about 2200 µF×3)used to absorb a ripple component of a motor current flowing into the electric motor 2 are molded; a terminal block 48 (FIG. 2 through FIG. 5) in which plural electrical conducting plates 43, 44, 45, 46, and 47 (FIGS. 4 and 5) are insert-molded with insulating resin; the motor housing 49 (FIGS. 2, 4, and 5) formed of an aluminum die cast used to fix the yoke 32; and the resolver 20 (FIG. 2) as a rotation position sensor that detects a rotation position of the rotor 10.

The control device 3 (FIG. 2) is fixed to the deceleration device 4 that decreases a rotation speed of the electric motor with screws (not shown) via the heat sink 36. The deceleration device 4 has a gear case 50 as a housing in contact with the heat sink 36, a worm gear 51 provided within the gear case 50 as means for decreasing rotations of the rotation shaft 30, and a worm wheel 52 meshed with the worm gear 51. A coupling 53 is fixed to an end portion of the worm gear 51 on the side of the rotor shaft 30. A torque is transmitted from the electric motor 2 to the worm gear 51 as the coupling 53 is coupled to the coupling 33. The gear case 50 is made of high thermal conductive metal, for example, aluminum or aluminum alloy.

The power boards 35 shown in FIG. 3 and FIG. 5 are high thermal conductive ceramic boards. For example, an aluminum plate (thermal conductivity: 237 W/mk) as a wiring pattern is provided on aluminum nitride (thermal conductivity: 180 W/mk). Also, large current components (up to 100 Arms), such as the semiconductor switching devices 15 together forming the three-phase bridge circuit that switches the motor current Im of the electric motor 2 according to magnitude and a direction of an auxiliary torque, the semiconductor switching devices 16 each forming the motor relay as a switching means for passing or interrupting the motor current Im supplied from the corresponding semiconductor switching devices 15 to the electric motor 2, and the shunt resistors 14 that detect a current of the electric motor 2, are mounted on the wiring patterns on the power boards 35 by soldering. Also, gate pads and source pads on the semiconductor switching devices 15 and 16 are connected to the wiring patterns by wire bonding (not shown).

The relay board 19 (FIGS. 3 and 4) is a high thermal conductive ceramic board as with the power boards 35. For example, an aluminum plate (thermal conductivity: 237 W/mk) as a wiring pattern is provided on aluminum nitride (thermal conductivity: 180 W/mk). The semiconductor switching devices 18 forming the power supply relay as a switching means for passing and interrupting a battery current Ib supplied from the battery 5 to the three-phase bridge circuit are mounted on the wiring pattern on the relay board 19 by soldering. Also, gate pads and source pads on the semiconductor switching devices 18 are connected to the wiring pattern by wire bonding (not shown).

The control board 24 (FIGS. 2, 4, and 5) is formed of a multi-layer (for example, four-layered) glass epoxy board. Peripheral circuit elements, including the microcomputer 22, the drive circuit 23, and the motor current detection means 21, are mounted on the control board 24 by soldering. The microcomputer 22 computes an auxiliary torque on the basis of the motor current Im flowing to the electric motor 2 that is detected by the current detection circuit 21 via one ends of the shut resistors 14 and a steering torque signal from the torque sensor 6, and also computes a current equivalent to the auxiliary torque on the basis of the motor current Im and a rotation position of the rotor 10 detected by the resolver 20, both of which are fed back to the microcomputer 22. The microcomputer 22 outputs signals to control the semiconductor switching devices 15, 16, and 18. Although it is not shown in the drawings, the microcomputer 22 includes a known self-diagnostic function in addition to an A-to-D converter and a PWM timer circuit and constantly conducts a self-diagnosis as to whether the system is normally operating, so that the motor current is interrupted upon occurrence of an abnormality. It should be noted that the control board 24 is provided with a through-hole to let the rotor shaft 30 described above pass through and notches to let the winding end portions 11a of the armature windings 11 pass through.

The resolver 20 is a rotation position sensor that detects a position of the rotor 10 and has a resolver rotor 20a and a resolver stator 20b. An outside diameter of the resolver rotor 20a forms a special curve so that permeance of a radial clearance between the resolver stator 20b and the resolver rotor 20a varies sinusoidally in angle. An exciting coil and two sets of output coils are wound around the resolver stator 20b, so that a two-phase output voltage changing between sines and cosines is outputted by detecting a variance of the radial clearance between the resolver rotor 20a and the resolver stator 20b.

The heat sink 36 (FIG. 2 through FIG. 5) is provided to the electric motor 2 on the side of the rotor shaft 30. The power boards 35 (FIGS. 3 and 5) and the relay board 19 (FIGS. 3 and 4) are provided to the heat sink 36 in close adhesion on the side of the electric motor 2. Also, the terminal block 48 (FIG. 5) is fixed to the heat sink 36 with an adhesive on the surface on which the power boards 35 (FIG. 5) are provided. Further, the circuit case 42 (FIGS. 4 and 5) on which are mounted the coil 17 and the capacitors 13 is fixed to this surface with screws (not shown).

The coil 17 and the capacitors 13 are inserted into a hole 36a (FIG. 4) provided to the heat sink 36 and installed therein, so that heat generated from the coil 17 and the capacitors 13 is released to the heat sink 36. Accordingly, because a temperature rise of the coil 17 and the capacitors 13 is suppressed, the coil 17 and the capacitors 13 become more reliable. In this instance, a clearance between the hole 36a provided to the heat sink 36 and the coil 17 and the capacitors 13 is filled with unillustrated high thermal conductive insulating adhesive or grease to promote heat dissipation of the coil 17 and the capacitors 13. Also, the heat sink 36 is fixed to the control device 3 with screws (not shown). Owing to this configuration, heat generated from the semiconductor switching devices 15, the coil 17, and the capacitors 13 is released to the heat sink 36 first and then released further to the deceleration device 4. Consequently, heat dissipation performance of the control device 3 is enhanced.

In the circuit case 42, the power connector 7 electrically connected to the vehicle battery 5, the vehicle-end signal connector 8 in and from which signals are inputted from and outputted to the vehicle via an outside wiring and the torque sensor connector 9 in and from which signals are inputted from and outputted to the torque sensor 6 via an outside wiring are molded integrally from insulating resin. Also, components, such as the electrical conducting plates 37, 38, 39, and 40 through which a large current of about up to 100 A is flown and the electrical conducting plate 41 through which a signal current of about several A is flown, are insert molded in the circuit case 42.

One end of the electrical conducting plate 37 (FIG. 3) is exposed from the insulating resin as a connector terminal 37a of the power connector 7. At an end other than the connector terminal 37a, a welding portion 37b is exposed from the insulating resin. One end of the coil 17 preventing an electromagnetic noise generated during a switching action of the semiconductor switching devices 15 from flowing out to the outside is electrically connected to this welding portion 37b by welding.

One end of the electrical conducting plate 38 (FIGS. 3 and 4) is exposed as a welding portion 38a. The other end of the coil 17 described above is electrically connected to this welding portion 38a by welding. Also, at the other end of the electrical conducting plate 38, a welding portion 38b electrically connected to the electrical conducting plate 43 of the terminal block 48 described below by welding is exposed from the insulating resin.

The electrical conducting plate 39 and the electrical conducting plate 40 (FIG. 3 through FIG. 5) are a part of the components forming the three-phase bridge circuit. A welding portion 39c electrically connected to the electrical conducting plate 44 of the terminal block 48 described below by welding and welding portions 39a and 40a electrically connected, respectively, to the electrical conducting plates 45 and 46 of the terminal block 48 described below are exposed from the insulating resin. The respective welding portions 39a and 40a are connected to the power boards 35. Also, welding portions 39b and 40b of the electrical conducting plates 39 and 40, respectively, are exposed from the insulating resin at three points. The respective capacitors 13 absorbing ripples of the motor current Im are electrically connected to the welding portions 39b and 40b by welding.

The power boards 35 (FIG. 3) on which are mounted the semiconductor switching devices 15 and 16, and the capacitors 13 are provided in pairs for respective arms A, B, and C of the three-phase bridge circuit and disposed concentrically with the rotor shaft 30. Also, the electrical conducting plates 39 and 40 are disposed parallel to each other and concentrically so as to link the respective arms A, B, and C in the shortest distances. By configuration in this manner, impedance across the three-phase bridge circuit can be reduced. Hence, not only does it become possible to absorb ripples efficiently, it also becomes possible to enhance power efficiency of the driving device. Also, it becomes possible to reduce an electromagnetic noise generated from a power line formed of the electrical conducting plates 39 and 40.

One end of the electrical conducting plate 41 (FIG. 5) is exposed from the insulating resin as a connector terminal 41a of the vehicle-end signal connector 8 or the torque sensor connector 9. Also, at an end other than the connector terminal 41a, soldering portions 41b are exposed from the insulating resin. These soldering portions 41b are inserted into through-holes of the control board 24 and soldered therein. Consequently, the soldering portions 41b are electrically connected to the wiring pattern on the control board 24. As with the control board 24, the circuit case 42 (FIG. 2) is provided with notches (FIG. 2) to let the wiring end portions 11a of the armature windings 11 pass through.

The electrical conducting plates 43, 44, 45, and 46 electrically connected to the electrical conducting plates 38, 39, and 40 of the circuit case 42, the electrical conducting plate 47 electrically connected to the control board 24, and an electrical conducting plate (not shown) electrically connected to the wiring end portions 11a of the armature windings 11 are insert-molded in the terminal block 48 (FIGS. 4 and 5) with the insulating resin. By integrally forming the respective electrical conducting plates by insert-molding with the insulating resin, not only can the reliability of the system be enhanced by ensuring an insulation property among the respective electrical conducting plates, but also the assembling man hours for the system can be reduced because the number of components is reduced.

At one ends of the electrical conducting plates 43 and 44 (FIG. 4), pads 43a and 44a connected to the relay board 19 by wire bonding so as to supply a current to the relay board 19 are formed so as to be exposed from the insulating resin. At the other ends of the electrical conducting plates 43 and 44, welding portions 43b and 44b are exposed from the insulating resin. These welding portions 43b and 44b are electrically connected to the electrical conducting plates 38 and 39, respectively, of the circuit case 42 by resistance welding.

At one ends of the electrical conducting plates 45 and 46 (FIG. 5), pads 45a and 46a connected to the power boards 35 by wire bonding so as to supply a current to the power boards 35 are formed so as to be exposed from the insulating resin. At the other ends of the electrical conducting plates 45 and 46, welding portions 45b and 46b are exposed from the insulating resin. These welding portions 45b and 46b are electrically connected to the electrical conducting plates 39 and 40, respectively, of the circuit case 42 by resistance welding.

At one end of the electrical conducting plate 47 (FIG. 4), pads 47a connected to the power boards 35 (FIGS. 3 and 5) by wire bonding so that signals are inputted and outputted between the power boards 35 and the control board 24 are formed so as to be exposed from the insulating resin. At the other end of the electrical conducting plate 47, soldering portions 47b are exposed from the insulating resin. The soldering portions 47b are inserted into through-holes of the control board 24 and soldered therein. Consequently, the wiring pattern on the power boards 35 and the wiring pattern on the control board 24 are electrically connected (FIG. 4). Hence, electronic circuits on the control board 24 are electrically connected to the semiconductor switching devices 15, the shunt resistors 14, and the like on the power boards 35 by way of the electrical conducting plate 47 and a wire bonding aluminum wire.

The pads 47a and the soldering portions 47b connecting the power boards 35 and the control board 24 are disposed on the periphery of the rotor shaft 30 that is the center of the driving device. By configuring in this manner, it becomes possible to effectively use the vicinity of the center on the control board 24 where mounting efficiency is poor otherwise. Consequently, the mounting efficiency as a whole is enhanced and the system can be reduced in size.

The motor housing 49 (FIG. 2) is fastened to the heat sink 36 with screws 54. Hence, the motor housing 49 together with the heat sink 36 covers the power boards 35, the relay board 19, the control board 24, the circuit case 42, and the terminal block 48. The motor housing 49 is also fastened to the electric motor 2 with screws (not shown). Any of the power boards 35, the relay board 19, and the control board 24, which are electronic components of the control device 3, is disposed in a closed space surrounded by the electric motor 2, the heat sink 36, and the motor housing 49. Hence, when the electric driving device 150 starts operating, temperatures of the electronic components rise due to own heat generation and the temperatures rise further due to influences of heat transmission and heat radiation from the electric motor 2.

In order to prevent temperature rises of the electronic components due to heat generation of the electric motor 2 (FIG. 2), a plate 49a is molded integrally with the motor housing 49 so as to stand perpendicularly to the axial direction of the rotor shaft 30 of the electric motor 2. The plate 49a divides a space surrounded by the electric motor 2, the heat sink 36, and the motor housing 49. As with the motor housing 49, the plate 49a is formed of an aluminum die cast and therefore has sufficiently high thermal conductivity in comparison with air (thermal conductivity of air: 0.028 W/mk, thermal conductivity of aluminum die cast (ADC12): 96 W/mk). Hence, when heat generated in the electric motor 2 is transmitted to the plate 49a, heat spreads all across the motor housing 49 first and is then released to the outside of the electric driving device 150. Also, because a radiation factor of the aluminum die cast is as low as about 0.2, most of radiation heat generated from the electric motor 2 is reflected on the plate 49a and does not reach the electronic components.

Owing to the advantages described above, by providing the plate 49a to the motor housing 49, it becomes possible to prevent heat transmission from the electric motor 2 to the electronic components. Consequently, because temperature rises of the electronic components can be suppressed, the system becomes more reliable. In addition, it also becomes possible to prevent water and dust from coming inside from the side of the electric motor 2. Hence, the system becomes reliable, too. The plate 49a is provided with a through-hole to let the rotor shaft 30 pass through and through-holes to let the winding end portions 11a of the armature winding 11 pass through. Accordingly, when the electric motor 2 is fixed, it becomes possible to fix the electric motor 2 without interference from the rotor shaft 30 and the winding end portions 11a of the armature windings 11.

Second Embodiment

Figure 6:
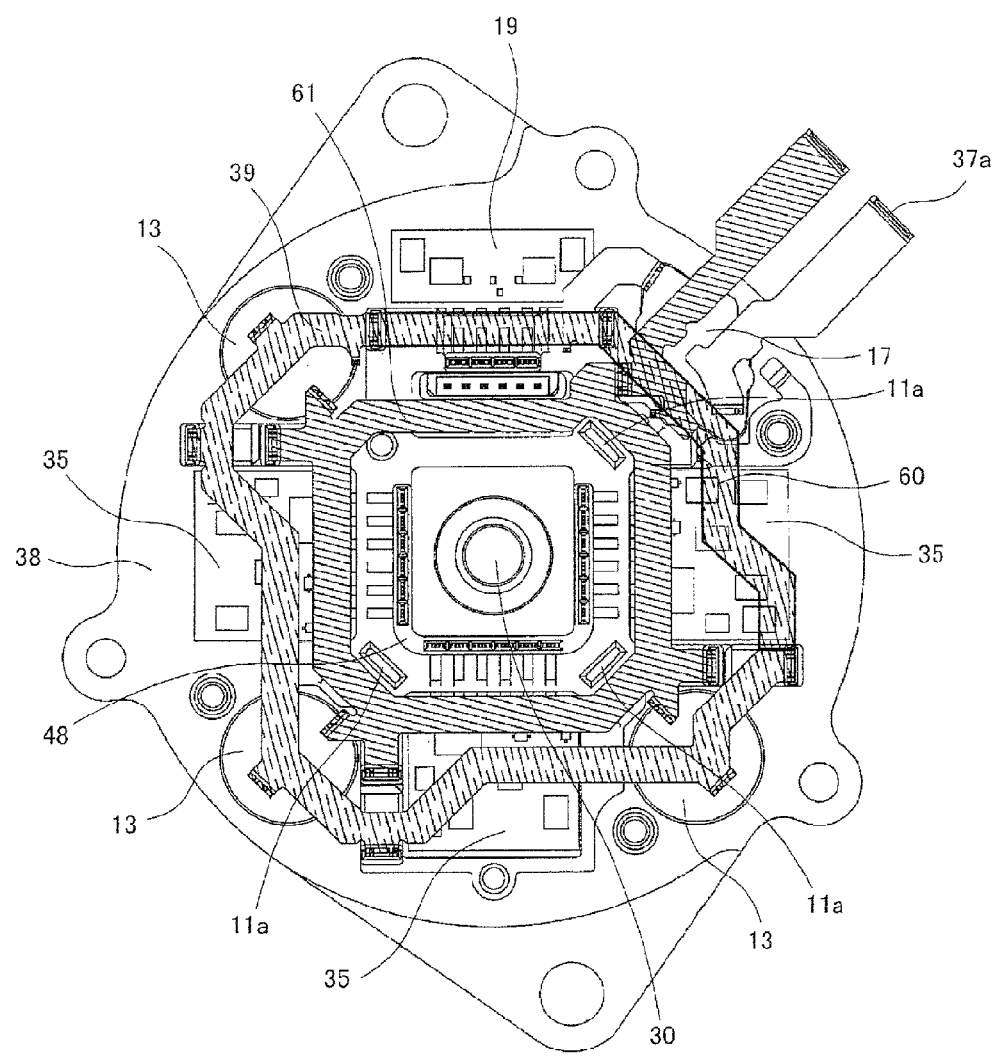
FIG. 6 is a sectional side view of a major portion of an electric driving device used in an electric power steering system according to a second embodiment of the invention.

An electric power steering system according to a second embodiment will now be described. FIG. 6 is a sectional side view of a major portion of an electric driving device used in the electric power steering system of the second embodiment and corresponds to FIG. 3 of the first embodiment above. The rest of the components are the same as the counterparts in the first embodiment above.

As is shown in FIG. 6, in an electric driving device 250 used in the electric power steering system of the second embodiment, electrical conducting plates 60 and 61 are formed in a ring shape by connecting a hot end (winding start) and a cold end (winding end). The electrical conducting plate 61 is connected to a connector terminal (not shown). Also, the electrical conducting plate 60 is connected to an output side of the relay board 19.

The electrical conducting plate 61 and the connector terminal and also the electrical conducting plate 60 and the relay board 19 are respectively connected at one point herein. It should be appreciated, however, that these components may be connected at two or more points. In the absence of the relay board 19, a terminal alternative to the relay board 19 can be used. By configuring in this manner, it becomes possible to reduce impedance across a power line that supplies power to the respective arms A, B, and C of the three-phase bridge circuit. Consequently, ripples of the electric driving device 250 are reduced and power efficiency can be enhanced.

Third Embodiment

Figure 7:
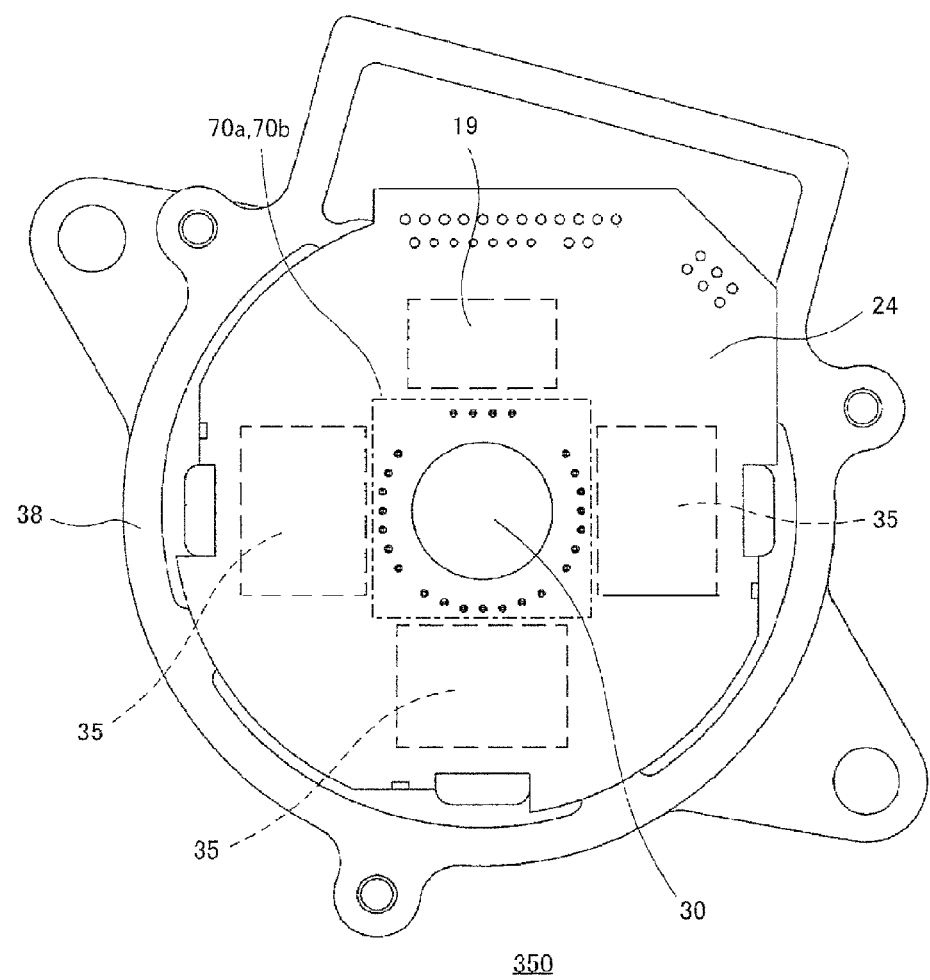
FIG. 7 is a sectional side view of a major portion of an electric driving device used in an electric power steering system according to a third embodiment of the invention.

An electric power steering system according to a third embodiment will now be described. FIG. 7 is a sectional side view of a major portion of an electric driving device used in the electric power steering system of the third embodiment and corresponds to FIG. 3 of the first embodiment above. The rest of the components are the same as the counterparts in the first embodiment above.

As is shown in FIG. 7, in an electric driving device 350 used in the electric power steering device of the third embodiment, pads 70a and soldering portions 70b (control terminals) connecting the control board 24 and the power circuit portion are disposed to the peripheral edge portion of the rotor shaft 30 along a circle about the rotor shaft 30 of the electric driving device 350. The pads 70a (control terminals) are formed in an arc-like pattern with respect to the center. By configuring in this manner, it becomes possible to effectively use the vicinity of the center on the control board 24 where mounting efficiency is poor otherwise. Consequently, the mounting efficiency as a whole is enhanced and the system can be reduced in size.

As has been described, according to the first through third embodiments above, the power boards 35 (FIG. 3) and the capacitors 13 of the control device 3 are provided in pairs for the respective arms A, B, and C of the three-phase bridge circuit and disposed concentrically with the rotor shaft 30. Hence, internal impedance of the electric driving device is reduced. Consequently, ripples are reduced and the power efficiency can be enhanced. In addition, because mounting efficiency of concentrically disposed components is enhanced, the system can be reduced in size.

Also, the electrical conducting plates 39 and 40 of FIG. 3 are provided concentrically with the rotor shaft 30 along the respective arms A, B, and C while a positive wiring and a negative wiring of a DC power supply are disposed parallel to each other. Hence, electromagnetic noises can be reduced.

Also, as is in the second embodiment, by forming the electrical conducting plates 60 and 61 in a ring shape, the internal impedance can be reduced further. Consequently, ripples are reduced and power efficiency can be enhanced.

Also, dissipation efficiency of the capacitors 13, which are heating components, is enhanced by embedding the capacitors 13 in the heat sink 36. Also, by filling a clearance between the embedded capacitors 13 and the heat sink 36 with a thermal conductive member, heat dissipation is enhanced.

Also, dissipation efficiency of the coil 17, which is a heating component, is enhanced by embedding the coil 17 in the heat sink 36. Also, by filling a clearance between the embedded coil 17 and the heat sink 36 with a thermal conductive member, heat dissipation is enhanced.

Also, the control device 3 is disposed between the electric motor 2 and the deceleration device 4 and the heat sink 36 is fixed in contact with the deceleration device 4. Hence, heat dissipation performance of electronic components on the power boards 35 (FIG. 5), such as the semiconductor switching devices 15 and the shunt resistors 14, those on the control board 24, and those inserted and installed in the hole 36*a* provided to the heat sink 36, such as the coil 17 and the capacitors 13, can be improved. Hence, not only can the system achieve a size reduction, a higher output, and a longer life, but also the system can be more reliable and durable.

Also, in the third embodiment above, connections between the power boards 35 and the control board 24 are disposed on the periphery of the rotor shaft 30 that is the center of the electric driving device. Hence, mounting efficiency of the control board 24 is enhanced and the system can be therefore reduced in size.

Also, by disposing connections between the power boards 35 and the control board 24 on the periphery of the rotor shaft 30 that is the center of the electric driving device and in an arc-like pattern along the peripheral portion of the rotor shaft 30 as in the third embodiment above, mounting efficiency of the control board 24 is enhanced and the system can be therefore reduced in size.

In the respective embodiments above, descriptions have been given on the assumption that the number of poles of the permanent magnet 31 is ten and the number of the salient poles of the stator 12 is twelve. It should be appreciated, however, that the numbers of the poles are not limited to the above combination and different numbers of the poles and salient poles may be combined. Also, the electric motor 2 is not limited to a brushless motor, either. The electric motor 2 can be an induction motor or a switched reluctance motor (SR motor). Also, the armature windings 11 of the electric motor 2 are connected by a Δ connection. It should be appreciated, however, that the armature windings 11 may be connected by a Y connection. Also, the respective phases of the armature windings 11 are connected by a 2 serial 2 parallel connection. It should be appreciated, however, that the respective phases may be connected by other wiring connection configurations, for example, in a 4 parallel connection. Also, the semiconductor switching devices 16 and 18 for the power supply relay and the motor relay, respectively, may be omitted. Also, descriptions have been given on the assumption that the power boards 35 each are a ceramic board on which an FET is mounted. It should be appreciated, however, that a metal board or a resin molded packaged product may be used as well and the semiconductor switching devices may be bipolar transistors or IGBTs.

Various modification and variations of the invention may readily occur to any one skilled in the art without deviating from the scope and spirit of the invention, and it should be understood that the invention is not limited to the descriptions of the embodiments above.

DESCRIPTION OF REFERENCE NUMERALS AND SIGNS

A, B, and C: arms (FIGS. 1 and 3)
1: steering wheel (FIG. 1)
2: electric motor (FIGS. 1 and 2)
3: control device (FIGS. 1 and 2)
4: deceleration device (FIGS. 1 and 2)
5: battery (FIG. 1)
6: torque sensor (FIG. 1)
7: power connector (FIGS. 1 and 2)
8: vehicle-end signal connector (FIG. 1)
9: torque sensor connector (FIGS. 1 and 5)
10: rotor (FIGS. 1 and 2)
11: armature winding (FIGS. 1 and 2)
11*a*: winding end portion (FIGS. 2, 3, and 6)
12: stator (FIGS. 1 and 2)
13: capacitor (FIGS. 1, 3, 4, and 6)
14: shunt resistor (FIGS. 1 and 5)
15: semiconductor switching device (FIGS. 1 and 5)
16: semiconductor switching device (FIG. 1)
17: coil (FIGS. 1, 2, 3, 4, and 6)
18: semiconductor switching device (FIGS. 1 and 4)
19: relay board (FIGS. 1, 3, 4, 6, and 7)
20: resolver (FIGS. 1 and 2)
21: motor current detection means (FIG. 1)
22: microcomputer (FIG. 1)
23: drive circuit (FIG. 1)
24: control board (FIGS. 2, 4, 5, and 7)
30: rotor shaft (FIGS. 2, 3, 6 and 7)
31: permanent magnet (FIG. 2)
32: yoke (FIG. 2)
33: coupling (FIG. 2)
34: insulator (FIG. 2)
35: power board (FIGS. 3, 5, 6, and 7)
36: heat sink (FIGS. 2, 3, 4, 5, and 6)
37: electrical conducting plate (FIG. 3)
38: electrical conducting plate (FIGS. 3, 4, 6, and 7)
39: electrical conducting plate (FIGS. 3, 4, and 5)
40: electrical conducting plate (FIGS. 3, 4, and 5)
41: electrical conducting plate (FIG. 5)
42: circuit case (FIGS. 2, 4, and 5)
43: electrical conducting plate (FIG. 4)
44: electrical conducting plate (FIG. 4)
45: electrical conducting plate (FIG. 5)
46: electrical conducting plate (FIG. 5)
47: electrical conducting plate (FIG. 4)
48: terminal block (FIGS. 2, 3, 4, 5, and 6)
49: motor housing (FIGS. 2, 4, and 5)
50: gear case (FIG. 2)
51: worm gear (FIG. 2)
52: worm wheel (FIG. 2)
53: coupling (FIG. 2)
60: electrical conducting plate (FIG. 6)
61: electrical conducting plate (FIG. 6)
70*a*: pad (FIG. 7)
70*b*: soldering portion (FIG. 7)
100: electric power steering system (FIGS. 1 and 2)
150: electric driving device (FIGS. 2 and 3)
250: electric driving device (FIG. 6)
350: electric driving device (FIG. 7)

The invention claimed is:

1. An electric driving device comprising: an electric motor and a control device disposed on an axial line of a rotor shaft of the electric motor and controlling driving of the electric motor, wherein the control device includes:
   semiconductor switching devices forming a three-phase bridge circuit that controls a current of the electric motor;
   capacitors suppressing a ripple component of a current flowing to the electric motor;
   a coil reducing noises generated during a switching action of the semiconductor switching devices;
   a power circuit portion including the semiconductor switching devices, the capacitors, and the coil;
   a heat sink on which the power circuit portion is mounted and which releases heat generated from the power circuit portion;
   a control board on which is mounted a microcomputer that generates a drive signal to drive the semiconductor switching devices; and
   a plurality of electrical conducting plates insert-molded with an insulating resin, are disposed parallel to each other and concentrically with the rotor shaft in a ring shape which electrically connect the respective arms of the three-phase bridge circuit in a shortest distance and electrically connect the capacitors which are disposed along the respective arms of the three-phase bridge circuit while a positive wiring and a negative wiring of a DC power supply are aligned parallel to each other on a same plane so as to reduce electromagnetic noise in the electrical conducting plates and facilitate a connection between the arms and the capacitors of the three-phase bridge circuit, the electrical conduction plates comprising a pad connected to a power board and a welding portion exposed from the insulating resin, and a portion of the electrical conducting plates are embedded within a circuit case of the control device
   wherein:
   the semiconductor switching devices and the capacitors are provided in pairs for respective arms of the three-phase bridge circuit and disposed concentrically with the rotor shaft, and the welding portion electrically connected to the electrical conducting plate is exposed from the insulating resin.

2. The electric driving device according to claim 1, wherein the electrical conducting plates are formed in a ring shape and disposed in such a manner that the positive wiring and the negative wiring are disposed concentrically with the rotor shaft.

3. The electric driving device according to claim 1, wherein the heat sink is provided with a hole larger than an outside diameter of the capacitors and the capacitors are inserted into the hole.

4. The electric driving device according to claim 3, wherein a clearance defined by the hole of the heat sink and the capacitors is filled with a high thermal conductive member.

5. The electric driving device according to claim 1, wherein the heat sink is provided with a hole larger than an outside diameter of the coil and the coil is inserted into the hole.

6. The electric driving device according to claim 5, wherein a clearance defined by the hole of the heat sink and the coil is filled with a high thermal conductive member.

7. The electric driving device according to claim 1 further comprising:
   control terminals electrically connecting the power circuit portion and the control board,
   wherein the control terminals are disposed along a peripheral edge portion of the rotor shaft about the rotor shaft of the electric motor.

8. The electric driving device according to claim 1 further comprising:
   control terminals electrically connecting the power circuit portion and the control board,
   wherein the control terminals are disposed along a peripheral edge portion of the rotor shaft about the rotor shaft of the electric motor.

9. The electric driving device according to claim 2 further comprising:
   control terminals electrically connecting the power circuit portion and the control board,
   wherein the control terminals are disposed along a peripheral edge portion of the rotor shaft about the rotor shaft of the electric motor.

10. The electric driving device according to claim 3 further comprising:
    control terminals electrically connecting the power circuit portion and the control board,
    wherein the control terminals are disposed along a peripheral edge portion of the rotor shaft about the rotor shaft of the electric motor.

11. The electric driving device according to claim 4 further comprising:
    control terminals electrically connecting the power circuit portion and the control board,
    wherein the control terminals are disposed along a peripheral edge portion of the rotor shaft about the rotor shaft of the electric motor.

12. The electric driving device according to claim 5 further comprising:
    control terminals electrically connecting the power circuit portion and the control board,
    wherein the control terminals are disposed along a peripheral edge portion of the rotor shaft about the rotor shaft of the electric motor.

13. The electric driving device according to claim 7, wherein
    the control board is provided with a hole to let the rotor shaft of the electric motor pass through, and the hole and the control terminals are disposed concentrically.

14. The electric driving device according to claim 1, wherein
    the power circuit portion includes a switching means that passes or interrupts a current flowing into the control device; and
    the switching means is formed of a plurality of semiconductor switching devices.

15. The electric driving device according to claim 1 further comprising:
    a deceleration device that decelerates the electric motor,
    wherein the heat sink is attached to a housing of the deceleration device.

16. The electric driving device according to claim 1 further comprising:
    a deceleration device that decelerates the electric motor,
    wherein the heat sink is attached to a housing of the deceleration device.

17. The electric driving device according to claim 2 further comprising:
    a deceleration device that decelerates the electric motor,
    wherein the heat sink is attached to a housing of the deceleration device.

18. The electric driving device according to claim 3 further comprising:

a deceleration device that decelerates the electric motor, wherein the heat sink is attached to a housing of the deceleration device.

19. The electric driving device according to claim 4 further comprising:
a deceleration device that decelerates the electric motor, wherein the heat sink is attached to a housing of the deceleration device.

20. The electric driving device according to claim 5 further comprising:
a deceleration device that decelerates the electric motor, wherein the heat sink is attached to a housing of the deceleration device.

21. The electric driving device according to claim 15, wherein
the housing of the deceleration device and the heat sink are made of high thermal conducting metal.

22. The electric driving device according to claim 21, wherein the high thermal conducting metal is aluminum or aluminum alloy.

23. The electric driving device according to claim 1, wherein the plurality of electrical conducting plates are welded to the capacitors via the welding portion.

24. An electric power steering system, comprising:
an electric motor;
a steering wheel that receives torque from the electric motor; and
a control device disposed on an axial line of a rotor shaft of the electric motor and controlling driving of the electric motor, wherein the control device includes:
semiconductor switching devices forming a three-phase bridge circuit that controls a current of the electric motor;
capacitors suppressing a ripple component of a current flowing to the electric motor;
a coil reducing noises generated during a switching action of the semiconductor switching devices;
a power circuit portion including the semiconductor switching devices, the capacitors, and the coil;
a heat sink on which the power circuit portion is mounted and which releases heat generated from the power circuit portion;
a control board on which is mounted a microcomputer that generates a drive signal to drive the semiconductor switching devices; and
a plurality of electrical conducting plates insert-molded with an insulating resin, are disposed parallel to each other and concentrically with the rotor shaft in a ring shape which electrically connect the respective arms of the three-phase bridge circuit in a shortest distance and electrically connect the capacitors which are disposed along the respective arms of the three-phase bridge circuit while a positive wiring and a negative wiring of a DC power supply are aligned parallel to each other on a same plane so as to reduce electromagnetic noise in the electrical conducting plates and facilitate a connection between the arms and the capacitors of the three-phase bridge circuit, the electrical conduction plates comprising a pad connected to a power board and a welding portion exposed from the insulating resin, and a portion of the electrical conducting plates are embedded within a circuit case of the control device
wherein:
the semiconductor switching devices and the capacitors are provided in pairs for respective arms of the three-phase bridge circuit and disposed concentrically with the rotor shaft, and the welding portion electrically connected to the electrical conducting plate is exposed from the insulating resin.

* * * * *